July 21, 1931. J. GAISER 1,815,470
MEANS FOR CONNECTING PLOWS TO TRACTORS
Filed Feb. 3, 1931
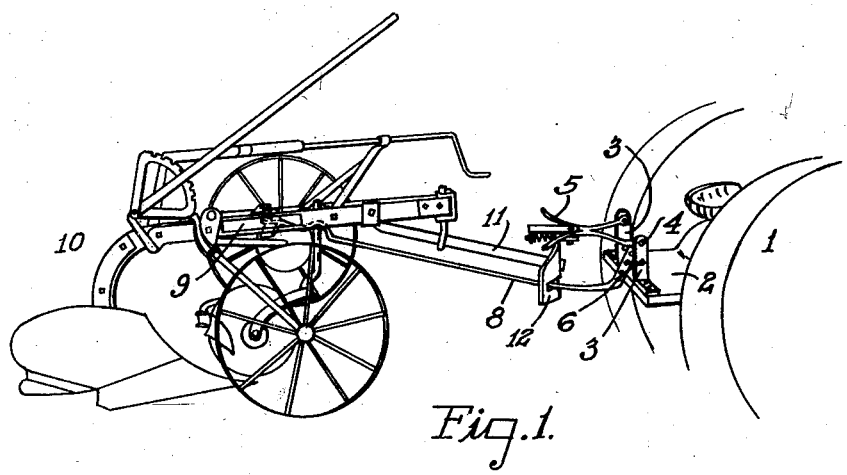
Fig.1.
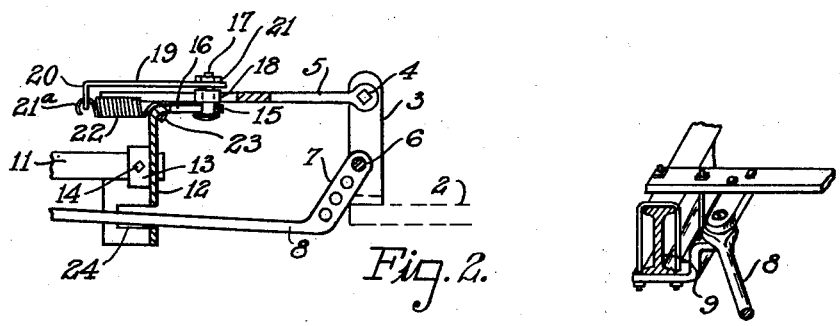
Fig.2.
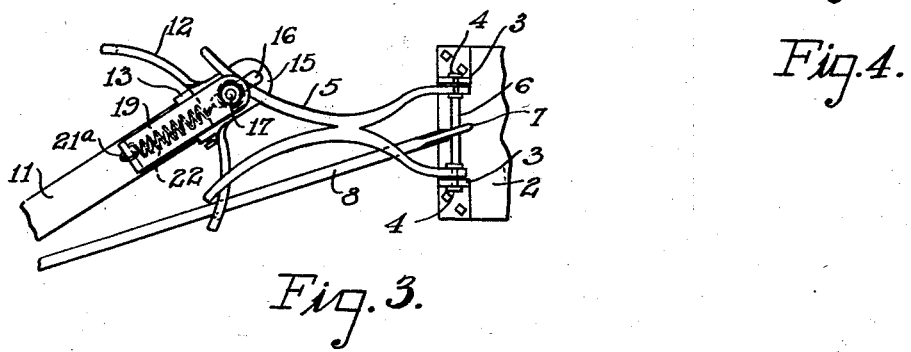
Fig.3.
Fig.4.
INVENTOR,
John Gaiser,
BY
Honard S. Smith,
His ATTORNEY Patented July 21, 1931

1,815,470

UNITED STATES PATENT OFFICE

JOHN GAISER, OF NEAR CENTERVILLE, OHIO

MEANS FOR CONNECTING PLOWS TO TRACTORS

Application filed February 3, 1931. Serial No. 513,153.

This invention relates to new and useful improvements in means for connecting plows to tractors.

It is the principal object of my invention to provide a simple and extremely flexible pivotal connection between a tractor and a plow, which will cause the latter to turn a very sharp corner, thus obviating the necessity of returning to plow a corner which has been skipped by the first plow. My two point pivotal connection between the tractor and the plow places the towing point so far in the rear that the plow will not skip the ground or throw it up like a sweet potato ridge when the tractor is making a turn.

My improved pivotal hitch means between the tractor and plow insures a uniform turning up of the soil at all times, whether the tractor is traveling a straight course or a curved one. Such connecting means may also be used to couple a manure spreader, wagon or other wheeled vehicle to a tractor.

In the accompanying drawings illustrating my invention, Figure 1 is a perspective view of a tractor and a plow connected by my two point, flexible pivotal means. Figure 2 is a side view of my towing attachment. Figure 3 is a plan view of the same. And Figure 4 is a perspective view of my towing means attached to a plow beam.

In the accompanying drawings illustrating my invention, the numeral 1 designates a tractor having a rear frame projection 2 to which two upright bracket members 3, 3 are secured. Connected between the upper ends of these bracket members, by pivot bolts 4, 4, is the inner part of an X member 5. Below this member there projects between the bracket members 3, 3 a transverse pin 6 which projects through one of a series of holes in the upwardly inclined part 7 of a pull or towing rod 8 which is pivotally secured at its rear end to the beam 9 of a sulky plow 10.

Secured to the front end of the plow 10 is a draw bar 11 from which the ordinary hitch has been removed to permit a curved towing or guide plate 12 to be attached thereto. This plate has a boss 13 on its middle portion, whereby it may be secured to the draw bar by a bolt 14.

The plate 12 has a horizontal, forwardly projecting lip portion 15 formed with a longitudinal slot 16. Free to move through the slot 16 is a shouldered stud 17 carrying a roller 18 which is free to slide over the lip portion of the plate.

Pivotally secured to the stud 17 above the roller 18 is a thrust bar 19 having a right-angled, downwardly projecting rear end 20. Above the bar 19 a nut 21 is applied to the stud 17.

The rear right-angled end 20 of the thrust bar 19 is formed with a hole to receive the hook end 21ª of a coil thrust spring 22 whose front end is formed with a hook part 23 to enter a hole in the lip portion of the plate 12.

The rear yoke portion of the X member 5 straddles, and is free to engage, the roller 18 on the stud 17. The spring 22, and thrust bar 19, have been provided to hold the stud in yielding engagement with the rear yoke portion of the X member.

Formed in the lower curved part of the plate 12 is an arcuate slot 24 through which the pull rod 8 projects to limit its relative movement to the draw bar.

My flexible coupling means between the tractor and the plow throws the pivotal connecting point, as represented by the stud 17, well outside the arc defined by the path of the tractor in making a turn, thus permitting the plow to cut a sharp corner rather than to skip over the ground.

The utmost turning freedom is thus given to the plow when the tractor makes a turn, so that it will not be swung around over the ground to make it necessary to return and plow the corner which would otherwise be skipped.

My flexible towing connection also makes it possible for the plow to follow freely and closely all depressions, ravines and gullies in the ground to plow it thoroughly at all times.

The coupling pin 6 is usually made of wood so that if the tractor encounters a stone or other obstruction, it will permit the coupling to be broken so that the plow will be separated from the tractor without any injury to either. My pivotal connecting means are such that when the pin 6 does break, the X or fulcrum member 5 is free to be pulled away from the stud 17 because it has no permanent connection with it.

Having described my invention, I claim:

1. Means for connecting a trailing unit to a tractor, comprising a pull member pivotally secured at its front end to the tractor and at its rear end to the trailing unit, a plate secured to the trailing unit in front of the point of connection of the pull member thereto, a stud secured to the plate for a longitudinal movement along the latter, a fulcrum member projecting rearwardly from the tractor, and resilient means for thrusting the stud forwardly into pivotal engagement with the fulcrum member.

2. Means for connecting a plow to a tractor, comprising a pull rod pivotally secured at its front end to the tractor and at its rear end to the plow, a plate formed with a longitudinal slot, secured to the plow in front of the point of connection of the pull rod thereto, a stud in said slot, a thrust member secured to said stud, a thrust spring connected between said member and the plate, to urge the thrust member in a forwardly direction, and a fulcrum member pivotally secured to the rear end of said tractor, said fulcrum member being formed at its rear end with a yoke portion to receive and engage the stud for the purpose specified.

3. Means for connecting a plow to a tractor, comprising a pull rod pivotally secured at its front end to the tractor and at its rear end to the plow, a plate secured to the plow in front of the point of connection of the pull rod thereto, said plate being formed with a longitudinal slot, a stud free to move through said slot, a thrust member secured at its front end to said stud, a coil thrust spring connected between the rear end of said thrust member and the plate to urge the stud forwardly, a roller on said stud beneath the thrust member, an upwardly projecting bracket secured to the rear end of the tractor, and a fulcrum member pivotally secured at its front end to said bracket, and formed at its rear end with a yoke portion adapted to receive and engage the stud for the purpose specified.

4. Means for connecting a plow to a tractor, comprising a pull rod pivotally secured at its front end to the tractor and at its rear end to the plow, a curved plate having a downwardly projecting portion formed with an arcuate slot, secured to the plow in front of the point of connection of the pull rod thereto, said plate having formed in its top portion a longitudinal slot, a stud free to move through said slot, a rearwardly projecting thrust member secured at its front end to said stud, a coil thrust spring connected between the rear end of said thrust member and the plate, said pull rod projecting through the arcuate slot in the downwardly projecting portion of the plate, and a horizontal tongue fulcrum member secured to the tractor and formed at its free end with a yoke portion to receive and engage the stud for the purpose specified.

In testimony whereof I have hereunto set my hand this 31st day of January, 1931.

JOHN GAISER.